Figure 1:
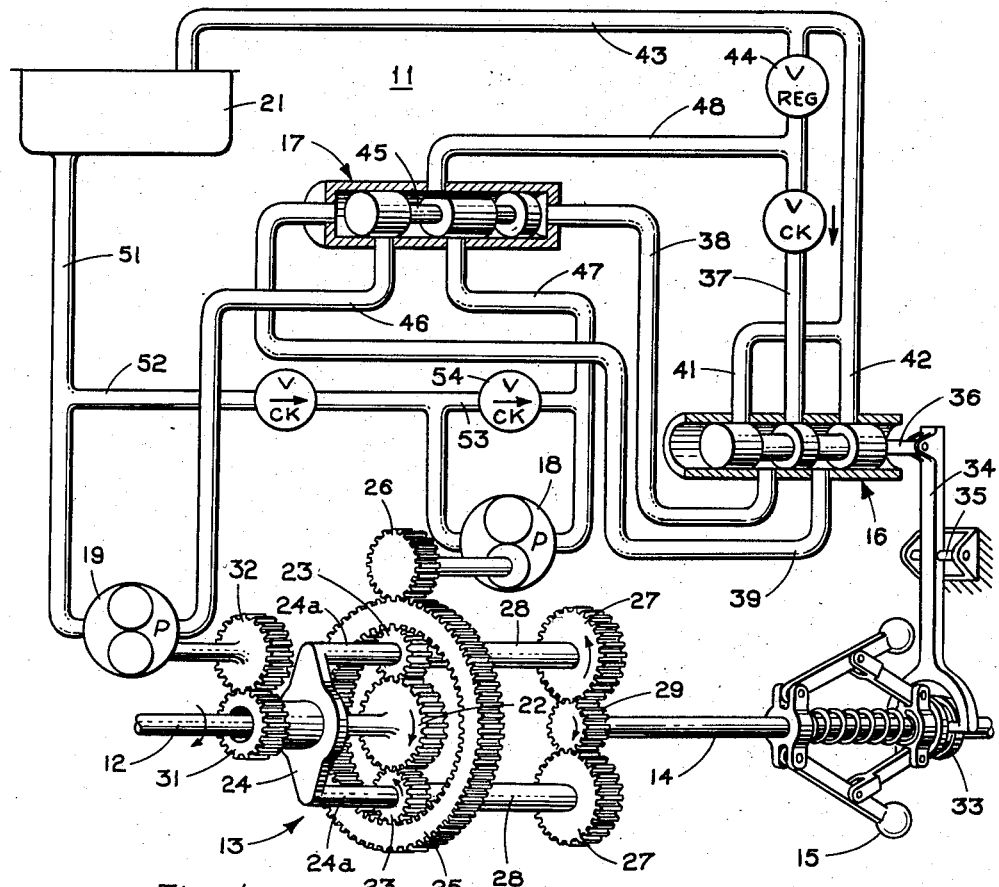

June 16, 1959     C. C. CAMPBELL, JR     2,890,604

CONSTANT SPEED SYSTEM

Filed June 20, 1955

INVENTOR.
CLAUDE C. CAMPBELL, JR.

United States Patent Office 2,890,604
Patented June 16, 1959

2,890,604

CONSTANT SPEED SYSTEM

Claude C. Campbell, Jr., Alexandria, Va., assignor to General Dynamics Corporation, San Diego, Calif., a corporation of Delaware Application June 20, 1955, Serial No. 516,469

11 Claims. (Cl. 74—752)

The present invention relates to a system for converting the variable speed of a prime mover to a substantially constant speed, and more particularly relates to a system which embodies an epicyclic gear mechanism for accepting the variable speed of a prime mover and converting that speed to a substantially constant speed.

The present constant speed system is particularly adapted for use in modern aircraft wherein there is a need for an economical, compact system to convert the variable speed of the aircraft engine to a substantially constant speed for driving the conventional aircraft alternator. As is well known, the alternator serves to supply fixed frequency current to various electrical equipment abroad the aircraft and for this reason the speed input to it should be relatively constant. Direct coupling of the alternator to the engine is therefore impractical, and the system of the present invention is designed for effecting a variable ratio connection between the driving and driven members of the engine and alternator, respectively.

Accordingly, the present invention comprises an epicyclic or planetary gear mechanism coupled between the engine and the alternator with the epicyclic gear mechanism being adapted for operative response to variable loading imposed by unique hydraulic loading means under the control of a governor device associated with the output of the present mechanism. Although the invention will herein be described with particular reference to use thereof with an aircraft engine and fixed frequency alternator, it is of course understood that the present invention is adapted for use with any other mechanism which requires the conversion of a variable speed to a substantially constant speed.

The present system is effective to deliver a substantially constant output speed through an input speed range whose lower limit will be designated as the minimum idle speed of the prime mover, and whose upper limit will be the top design speed at which the system is capable of operation. At minimum idle speed and at a speed just below the cruising speed of the prime mover, the system of the present invention is characterized by peak efficiency as compared with operation of the system at other speeds. These peak efficiencies result at such speeds by virtue of the comparatively light loads then imposed upon the epicyclic gear train by the hydraulic loading means which is coupled to the system.

In the preferred embodiment of the present invention the hydraulic loading means comprises a pair of hydraulic gear pumps, one of which is effective to control the variable loading of the epicyclic gear mechanism from minimum idle speed up to a speed of the gear mechanism termed the crossover speed, and the other of which gear pumps is effective to control the variable loading of the gear mechanism from its crossover speed to its upper design speed. In this manner the speed ratio of the driving and driven members may be gradually varied within the design limits of the present constant speed system.

It is therefore an object of the present invention to provide an improved system for accepting a variable speed input and delivering a predetermined constant speed output.

Another object of the invention is to provide a novel constant speed system which converts a variable speed to a predetermined constant speed by means including hydraulic means which provide variable loading of the system under the control of a governor mechanism associated with the output of the system.

An additional object of the invention resides in the provision of an improved system for conversion of the variable speed of a prime mover to a constant speed through the use of a epicyclic gear mechanism which is variably loaded in response to the variable input speed to thereby produce a substantially constant output speed.

A further object of the invention is to provide an unique planetary gear means for effecting a variable speed connection between driving and driven members, and which is characterized by peak efficiencies at or near minimum idle and cruising speeds of the driving member.

Figure 2:
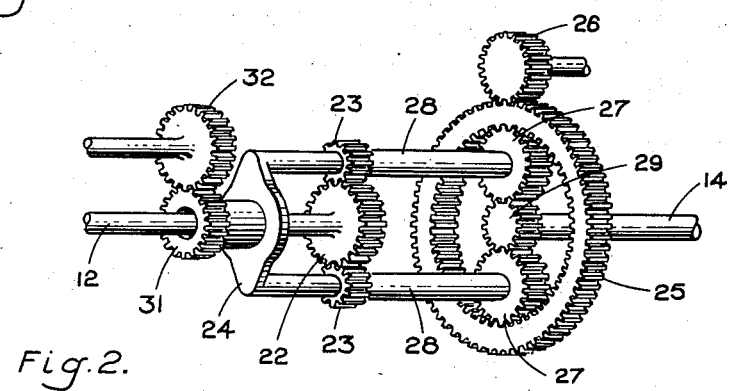

Other objects and features of the present invention will be readily apparent to those skilled in the art from the following specification and appended drawings wherein in is illustrated a preferred form of the invention, and in which:

Figure 1 is a diagrammatic view of the present invention, the various elements thereof being illustrated in the positions assumed during minimum idling speed condition; and Figure 2 is an elevational view of an epicyclic gear train of a modified type.

Referring to the drawings and more particularly to Figure 1, there is illustrated an embodiment of the speed conversion or constant speed system of the present invention which is generally designated 11, and which is adapted for use in connection with a prime mover such as an aircraft engine (not shown) or the like to convert the variable speed output of such engine to a constant speed for driving an alternator (not shown) for example.

Constant speed mechanism 11 comprises generally an engine or input shaft 12 which serves to drive an epicyclic or planetary gear mechanism 13 which in turn drives an output shaft 14. The rotation of output shaft 14 operates a governor device 15 which in its movement serves to effect operation of a pair of hydraulic control valves 16 and 17 which in turn control the operation of a pair of loading devices 18 and 19. Loading devices 18 and 19 are preferably hydraulic gear pumps of conventional construction supplied from a reservoir 21, but it is contemplated that other loading devices such as friction or magnetic brakes may also be used if desired, the loading devices 18 and 19 serving mainly to variably load certain components of gear mechanism 13, as will be more fully described hereinafter.

Planetary gear mechanism 13 includes a center or sun gear 22 rigidly secured to the end of input shaft 12 and which upon rotation of shaft 12 serves to rotate a plurality of pinion or planet gears 23, preferably two in number, which are rotatably mounted on opposed legs 24a of a spider or carrier 24 suitably rotatably carried by shaft 12. Planet gears 23 mesh with internal teeth of an outer or ring gear 25 which is concentrically disposed about sun gear 22 so that rotation of gears 23 about their axes effects a corresponding rotation of gear 25 which is transmitted to a pump drive gear 26 through the externally toothed periphery of gear 25, as illustrated. With this arrangement, upon rotation of input shaft 12, assuming carrier 24 is prevented from rotating on shaft 12 as by means to be hereinafter described, sun gear 22 will drive planet gears 23, driving ring gear 25, which in turn will rotate a pump drive gear 26 which serves to drive pump 18. In addition, again assuming that carrier 24 is fixed against rotation, the rotation of planet gears 23 will be completely transmitted to a pair of gears 27 which are integrally connected in any suitable manner to gears 23, as by carrier elements or sleeves 28 rotatably sleeved upon legs 24a of a spider 24. Gears 27 are meshed with an output gear 29, which is rigidly affixed to an end of output shaft 14, whereby rotation of input shaft 12 will be transmitted to output shaft 14. It is noted that because of the integral connection of gears 27 to planet gears 23, any rotative action of gears 23 about the axis of carrier 24 is also transmitted to gears 27, resulting in planetary motion of gears 27 about output gear 29. In addition, fixed to the end of carrier 24 and free to rotate therewith about input shaft 12, is a carrier gear 31 which rotates with carrier 24 to drive a pump drive gear 32 connected to pump 19. It will be apparent that unless pump 19 is free to operate, that is, not hydraulically locked, rotation of carrier 24 on shaft 12 is not possible. With this arrangement of components, epicyclic mechanism 13 serves, within the predetermined speed range for which the system is designed, to maintain constant the speed of rotation of output gear 29 by altering the relative rotation of gears 27 about their own axes or about the axis of carrier 24 in response to the loading imposed by loading device 18 and 19 upon ring gear 25 and carrier 24, respectively.

Operatively associated with output shaft 14 is a speed sensing mechanism which may be of any conventional or standard type which is adapted to translate the rotational speed of output shaft 14 into longitudinal or axial movement for actuating control valve 16. In the present device the speed sensing device is the fly ball governor 15, which is rigidly affixed to output shaft 14 and spring biased against a grooved spindle 33 which is slidably mounted upon shaft 14 so that operation of governor device 15 serves to move spindle 33 to the right or left in response to such operation. The lower end of an arm 34 rides within the groove of spindle 33, and arm 34 is pivoted at 35 so that upon linear movement of spindle 33 to the right, for example, movement to the left of the upper end of arm 34 will be produced. Similarly, upon movement of spindle 33 to the left under the urging of governor device 15, the upper end of arm 34 will be moved to the right. In this manner arm 34 effects reciprocal movement of a movable core 36 of control valve 16.

Movable core 36 of valve 16 when moved to the right channels hydraulic fluid from a hydraulic line 37 into a hydraulic line 38, and when moved to the left channels hydraulic fluid from line 37 into a hydraulic line 39. A pair of hydraulic lines 41 and 42 are also connected to valve 16 and serve to vent hydraulic fluid from valve 16 into a hydraulic line 43 which discharges into reservoir 21. In addition, line 37 is also provided with a regulator valve 44 which serves to maintain pressure in line 37 at all times during the operation of the present system 11 so that fluid in line 37 will tend to flow into either of lines 38 or 39 when core 36 of valve 16 is moved. It is noted that the core 45 of valve 17 is made somewhat smaller than the bore of valve 17 so that when the prime mover is first started, pressure in line 37 may be developed by the small amount of flow of fluid from pump 19, through line 46 and valve 17. Thus, line 46 would not be completely blocked, and pump 19 would be turning slightly at minimum idle. As an alternative, if desired, the pressure required in line 37 could be obtained by suitably connecting line 37 to an auxiliary source of pressure (not shown) of any conventional type.

A longitudinally movable core 45 of valve 17 is provided with the shape and configuration illustrated so that gradual movement of core 45 varies the restriction to a flow of fluid from a pair of hydraulic lines 46 and 47, which are connected to pumps 19 and 18 respectively, into a hydraulic line 48 which is in fluid circuit with lines 37 and 43. It is noted that movement of core 45 to the left is effected by fluid acting through line 38, with the fluid from the left side of core 45 draining through line 39, valve 16, line 42, and line 43 into reservoir 21. Similarly, movement of core 45 to the right is effected by fluid acting through line 39, with the fluid from the right side of core 45 draining through line 38, line 41, and 43 into reservoir 21.

A hydraulic line 51 connects pump 19 to reservoir 21, and a hydraulic line 52 branches off line 51 to connect pump 18 to reservoir 21. In addition, a branch hydraulic line 53 provides a fluid connection between lines 52 and 47 so that a circulatory path comprising lines 52, 53, and 47 is provided for the output of pump 18 when line 47 is blocked at valve 17 by valve core 45. A check valve 54 is provided in line 53 and allows free flow in the direction indicated.

In the operation of the present constant speed system 11, input shaft 12 transmits the rotational movement of the prime mover to sun gear 22, which in turn serves to rotate planet gears 23 about their own axes. Gears 23 cannot rotate about the axis of carrier 24 at this time since carrier 24 is held stationary by the action of valve 17 in blocking any output of pump 19. That is, since pump 19 is hydraulically locked, pump drive gear 32, carrier gear 31, and hence carrier 24 will all be constrained against movement. Carrier 24 is thus completely loaded at this time by pump 19, and, although valve 17 blocks fluid flow from pump 18, pump 18 is free to be driven since its output may be channeled through check valve 54. Thus pump drive gear 26 is free to rotate, as is ring gear 25 meshed therewith, so that ring gear 25 does not impede the rotation of planet gears 23, enabling gears 23 to transmit their rotation to gears 27 and thence to output gear 29 and output shaft 14. This is the condition which exists at minimum idle speed of the prime mover. It is noted that output shaft 14 is turned at a ratio determined by the product of the ratio of sun gear 22 to planet gears 23 and the ratio of gears 27 to output gear 29.

When input shaft 12 increases in speed above the minimum idle speed, tending to increase the speed of output shaft 14 above the desired constant speed, the increasing speed of rotation of output shaft 14 operates governor device 15, which through link or arm 34 effects movement to the right of core 36 of valve 16. Hydraulic fluid under pressure is channeled from line 37 and metered through valve 16 into line 38, moving core 45 of valve 17 to the left. This movement of core 45 reduces the restriction to flow of fluid from line 46, effecting an unloading of pump 19 and permitting pump 19 to rotate. As pump 19 rotates, carrier 24 turns clockwise and effects a reduction of speed of output shaft 14 to the desired constant speed.

When output shaft 14 tends to decrease in speed below the desired constant speed, it will be apparent that governor device 15 will operate to cause movement of core 36 of valve 16 to the left, channeling hydraulic fluid under pressure from line 37 to line 39. This produces movement of core 45 of valve 17 to the right increasing the restriction to the flow of fluid through valve 17 from line 46. The load on pump 19 is thus increased, slowing down the rotation of carrier 24 and increasing the speed of rotation of output shaft 14.

It will be evident that the greater the speed of input shaft 12 above minimum idle speed the greater the movement to the left of core 45 of valve 17, and hence the greater the unloading of pump 19 and the rotational speed of carrier 24. This decreases the input to output ratio of system 11 to thereby maintain output shaft 14 at the desired constant speed.

Assuming that the rotational speed of input shaft 12 continues to increase, the speed of rotation of carrier 24 increases and the counterclockwise rotation of ring gear 25 will be slowing until gear 25 is at a standstill. The speed of input shaft 12 at this time is termed the changeover or crossover speed, and it corresponds approximately with the cruising speed of the prime mover. A further increase in the speed of input shaft 12 effects a turning of ring gear 25 in an opposite or clockwise direction since core 45 of valve 17 at this time is allowing free flow of fluid from pump 19 and is just beginning to allow a flow of fluid from pump 18 through line 47. Still further increases in the rotational speed of input shaft 12 tend to be converted to the desired constant speed by the variable loading imposed by pump 18. Thus, at speeds below the crossover speed the output speed is controlled by the variable loading of pump 19, and at speeds above the crossover speed the output speed is controlled by the variable loading of pump 18. It is seen, therefore, that at an input speed approximating the changeover speed there is a peak efficiency of the present system 11 since pump 18 is substantially at a standstill and the load upon pump 19 is at a minimum because of the free flow of fluid permitted from pump 19 through valve 17. It is noted that a peak efficiency is also achieved at minimum idle speed since at that time pump 19 is hydraulically locked and pump 18 is merely circulating fluid through check valve 54.

In Figure 2 there is illustrated a modification of planetary gear mechanism 13 in which the arrangement of components is identical to mechanism 13 except for the positioning of ring gear 25, and pump drive gear 26 associated therewith, in operative meshing association with gears 27 instead of gears 23. This is useful in applications where a greater separation of speed is required between minimum idle speed and crossover speed, since the arrangement of Figure 2 will effect a higher crossover speed.

Further, it is contemplated that for certain applications control of the present system may be effected through the use of pump 19 and eliminating pump 18, gear 26, and ring gear 25, or through the use of pump 18 and eliminating pump 19, gear 32, and carrier gear 31.

Thus, the present system 11 serves to convert the variable speed output of a prime mover to a constant speed, system 11 including controlling members, that is the carrier 24 and ring gear 25, which are loaded mechanically to vary the ratio of system 11. Pumps 18 and 19 demonstrate one form of satisfactory loading, pump 19 having its output completely blocked for input speeds up to minimum idle so that carrier 24 cannot rotate. As the input speed increases above minimum idle speed pump 19 is unloaded enough to permit carrier 24 to rotate, reducing the overall ratio of the system 11 so that the desired constant speed output is maintained. When the crossover speed for system 11 is achieved pump 18 begins unloading, pump 19 being completely unloaded at this time, and pump 18 together with ring gear 25 then become the controlling members. Since the input speed will be increasing or decreasing through the crossover point, the method of crossover above described is relatively smooth for the reason that the change in direction of rotation of ring gear 25 is gradual. Further, it will be apparent that gear sizes and ratios may be selected to provide a crossover speed, and resulting peak efficiency, at any desired point in the operating speed range of the prime mover.

While certain preferred embodiments of the invention have been specifically disclosed, it is understood that the invention is not limited thereto as many variations will be readily apparent to those skilled in the art and the invention is to be given its broadest possible interpretation within the terms of the following claims:

I claim:

1. A system for converting a variable input speed to a substantially constant output speed, said system comprising an epicyclic gear mechanism embodying a sun gear mounted for common rotation with an input shaft and planetary gears cooperating with a ring gear which is adapted for reverse movement at a predetermined input speed, said mechanism being adapted for accepting an input and for delivering an output whose speed ratio to said input is adjustable, and loading means operative upon said epicyclic gear mechanism to adjust said speed ratio, said loading means including a first hydraulic pump operatively coupled to said planetary gears for varying the relative speed between said planetary gears and said sun gear prior to the condition of reverse movement by said ring gear, and a second hydraulic pump operatively coupled to said ring gear for varying the relative speed between said planetary gears and said sun gear subsequent to the condition of reverse movement by said ring gear, hydraulic valve means operative to control said first hydraulic pump and said second hydraulic pump, an output shaft driven by said epicyclic gear mechanism, and speed responsive means coupled to said output shaft for initiating operation of said hydraulic valve means in response to the speed of said output shaft to effect control of said first hydraulic pump and said second hydraulic pump.

2. A system for converting a variable input speed to a substantially constant output speed, said system comprising an epicyclic gear mechanism for accepting an input speed and for delivering an output speed whose ratio to said input speed is determined by loads imposed upon said epicyclic gear mechanism, said epicyclic gear mechanism including a sun gear, a support member rotatably carrying a plurality of first planetary gears and a plurality of second planetary gears of larger diameter than said first planetary gears, means carried by said support member for securing together, respectively, said plurality of first planetary gears and said plurality of second planetary gears whereby there is correspondence of rotation therebetween, and a ring gear meshed with said plurality of second planetary gears for rotation thereabout, output means coupled to said plurality of second planetary gears, loading means controllable for applying various loads to said support member and said ring gear of said epicyclic gear mechanism, and means coupled to said output means and responsive to the output speed of said epicyclic gear mechanism for controlling said loading means to adjust the load applied by said loading means.

3. A system for converting a variable input speed to a substantially constant output speed, said system comprising a driver member, a driven member, and intermediate means coupled between said driver member and said driven member for varying the speed ratio therebetween, said intermediate means including a first plurality of planetary elements coupled to said driven member, carrier means rotatable about said driver member and carrying a second plurality of planetary elements rotatable with said first plurality of planetary elements, means operatively coupling said second plurality of planetary elements with said driver member, a rotatable outer element upon which said second plurality of planetary elements operate during rotation of said carrier means, a first hydraulic resistance device controllable for restraining said carrier means against rotation, a second hydraulic resistance device controllable for restraining said outer element against rotation, and control means for controlling said first hydraulic resistance device and said second hydraulic resistance device in response to the rotation of said driven member, said control means including a first hydraulic valve operable to alter the restraint imposed by said first hydraulic resistance device and by said second hydraulic resistance device, a governor device coupled to said driven member, and a second hydraulic valve adapted to be actuated by said governor device for operating said first hydraulic valve.

4. A system for converting a variable input speed to a substantially constant output speed, said system comprising a driver member having a predetermined crossover rotational speed, a driven member, and intermediate means coupled between said driver member and said driven member for varying the speed ratio therebetween, said intermediate means including a first plurality of planetary elements coupled to said driven member, carrier means rotatable about said driver member and carrying a second plurality of planetary elements rotatable with said first plurality of planetary elements, means operatively coupling said second plurality of planetary elements with said driver member, a rotatable outer element upon which said second plurality of planetary elements operate during rotation of said carrier means, a first hydraulic pump controllable for hydraulically restraining rotation of said carrier, a second hydraulic pump controllable for hydraulically restraining rotation of said outer element, and control means for directing the fluid flow from said first hydraulic pump and said second hydraulic pump in response to the rotation of said driven member, said control means including a first hydraulic valve operable to regulate the fluid flow from said first hydraulic pump and said second hydraulic pump, speed responsive means coupled to said driven member, and a second hydraulic valve adapted to be actuated by said speed responsive means for operating said first hydraulic valve to block fluid flow from said second hydraulic pump at the crossover speed of said driver member.

5. A system for converting a variable input speed to a substantially constant output speed, said system comprising a driver member having a predetermined minimum idle speed, a driven member, and intermediate means coupled between said driver member and said driven member for varying the speed ratio therebetween, said intermediate means including a first plurality of planetary elements coupled to said driven member, carrier means rotatable about said driver member and carrying a second plurality of planetary elements rotatable with said first plurality of planetary elements, means operatively coupling said second plurality of planetary elements with said driver member, a rotatable outer element upon which said second plurality of planetary elements operate during rotation of said carrier means, a first hydraulic pump controllable for hydraulically restraining rotation of said carrier, a second hydraulic pump controllable for hydraulically restraining rotation of said outer element, and control means for directing the fluid flow from said first hydraulic pump and said second hydraulic pump in response to the rotation of said driven member, said control means including a first hydraulic valve operable to regulate the fluid flow from said first hydraulic pump and said second hydraulic pump, speed responsive means coupled to said driven member, and a second hydraulic valve adapted to be actuated by said speed responsive means for operating said first hydraulic valve to block fluid flow from said first hydraulic pump at the minimum idle speed of said driver member.

6. A system for converting a variable input speed to a substantially constant output speed, said system comprising a driver member, a driven member, and intermediate means coupled between said driver member and said driven member for varying the speed ratio therebetween, said intermediate means including a first plurality of planetary elements coupled to said driven member, carrier means rotatable about said driver member and carrying a second plurality of planetary elements rotatable with said first plurality of planetary elements, means operatively coupling said second plurality of planetary elements with said driver member, a rotatable outer element upon which said second plurality of planetary elements operate during rotation of said carrier means, a loader element controllable for restraining said carrier means against rotation, and control means for controlling said loader element in response to the rotation of said driven member, said control means including a first valve operable to control said loader element, a second valve embodying a core movable in one direction for operating said first valve to increase the restraint imposed upon said carrier means by said loader element and movable in the other direction for operating said first valve to decrease the restraint imposed upon said carrier means by said loader element, and speed responsive means coupled between said driven member and said core of said second valve.

7. A system for converting a variable input speed to a substantially constant output speed, said system comprising a driver member, a driven member, and intermediate means coupled between said driver member and said driven member for varying the speed ratio therebetween, said intermediate means including a first plurality of planetary elements coupled to said driven member, carrier means rotatable about said driver member and carrying a second plurality of planetary elements rotatable with said first plurality of planetary elements, means operatively coupling said second plurality of planetary elements with said driver member, a rotatable outer element upon which said second plurality of planetary elements operate during rotation of said carrier means, a loader element controllable for restraining said carrier means against rotation, and control means for controlling said loader element in response to the rotation of said driven member, said control means including a first valve operable to control said loader element, a second valve embodying a core movable in one direction for operating said first valve to increase the restraint imposed upon said carrier means by said loader element and movable in the other direction for operating said first valve to decrease the restraint imposed upon said carrier means by said loader element, and a governor coupled between said driven member and said core of said second valve for moving said core to decrease the restraint imposed by said loader element at speeds above a predetermined speed of said driven member and for moving said core to decrease the restraint imposed by said loader element at speeds below said predetermined speed.

8. A system for converting a variable input speed to a substantially constant output speed, said system comprising an epicyclic gear mechanism having a sun gear mounted for common rotation with an input shaft, a ring gear, and planetary gears cooperating with said sun gear and said ring gear, said mechanism being adapted for accepting an input and for delivering an output whose speed ratio to said input is adjustable, loading means operative upon said epicyclic gear mechanism to adjust said speed ratio, said loading means including a first hydraulic resistance device operative to retard the planetary rotation of said planetary gears and a second hydraulic resistance device operative upon said ring gear for varying the relative speed between said planetary gears and said sun gear, control means coupled to said first hydraulic resistance device and to said second hydraulic resistance device, an output shaft driven by said epicyclic gear mechanism, and speed responsive means coupled to said output shaft for initiating operation of said control means in response to the speed of said output shaft to effect operation of said first hydraulic resistance device and said second hydraulic resistance device, said control means including a first hydraulic valve operable to control the restraint imposed by said first hydraulic resistance device and by said second hydraulic resistance device, said control means further including a second hydraulic valve coupled to said speed responsive means for operating said first hydraulic valve in accordance with changes in the speed of said output shaft.

9. A system for converting a variable input speed to a substantially constant output speed, said system comprising an epicyclic gear mechanism having a sun gear mounted for common rotation with an input shaft, a ring gear and planetary gears cooperating with said sun gear and said ring gear, said mechanism being adapted for accepting an input and for delivering an output whose speed ratio to said input is adjustable, loading means operative upon said epicyclic gear mechanism to adjust said speed ratio to produce a predetermined constant output speed, said loading means including a first hydraulic pump operative for hydraulically altering the speed of rotation of said planetary gears about their planetary axis and a second hydraulic pump operative for hydraulically altering the speed of rotation of said planetary gears about their own axes, control means coupled to said first hydraulic pump and to said second hydraulic pump, an output shaft driven by said epicyclic gear mechanism, and governor means coupled to said output shaft for initiating operation of said control means in response to the speed of said output shaft to effect operation of said first hydraulic pump and said second hydraulic pump, said control means including a first hydraulic valve operable to control the operation of said first hydraulic pump and said second hydraulic pump, said control means further including a second hydraulic valve coupled to said governor means for operating said first hydraulic valve in accordance with changes in the speed of said output shaft above and below said predetermined constant output speed.

10. A system for converting a variable input speed of an input shaft to a substantially constant output speed, said system comprising an epicyclic gear mechanism having a sun gear mounted on said input shaft for common rotation therewith, a ring gear, and planetary gears cooperating with said sun gear and said ring gear, said mechanism being adapted for accepting an input and for delivering an output whose speed ratio to said input is adjustable, loading means operative upon said epicyclic gear mechanism to adjust said speed ratio, said loading means including a first hydraulic pump and first gear means for driving said first hydraulic pump, said first gear means being operatively connected to said planetary gears, said loading means also including a second hydraulic pump and second gear means for driving said second hydraulic pump, said second gear means being operatively connected to said ring gear, control means coupled to the output of said first hydraulic pump and said second hydraulic pump and adapted to be operated to adjust the output of said first hydraulic pump and said second hydraulic pump to thereby adjust the relative speed between said planetary gears and said sun gear, and speed responsive means coupled to the output of said epicyclic gear mechanism for operating said control means.

11. A system for converting a variable input speed to a substantially constant output speed, said system comprising an epicyclic gear mechanism for accepting an input speed of an input shaft and for delivering an output speed whose ratio to said input speed is determined by loads imposed upon said epicyclic gear mechanism, said epicyclic gear mechanism including a sun gear mounted for common rotation with said input shaft, a ring gear, and planetary gears cooperating with said sun gear and said ring gear and adapted for rotation about their own axes and about the axis of said sun gear, rotatable means adapted for rotation in correspondence with the rotation of said planetary gears about said sun gear, loading means controllable for applying various loads to said epicyclic gear mechanism, said loading means including a first hydraulic pump and first gear means for driving said first hydraulic pump, said first gear means being operatively connected to said rotatable means, said loading means also including a second hydraulic pump and second gear means for driving said second hydraulic pump, said second gear means being operatively connected to said ring gear, control means coupled to the output of said first hydraulic pump to adjust the output of said first hydraulic pump to thereby regulate rotation of said planetary gears about said sun gear, said control means also being coupled to the output of said second hydraulic pump to adjust the output of said second hydraulic pump to thereby regulate rotation of said planetary gears about their own axes, an output shaft driven by said epicyclic gear mechanism, and a governor device responsive to the speed of said output shaft for initiating operation of said loading means to adjust the loads applied by said loading means.

References Cited in the file of this patent

UNITED STATES PATENTS

| Re. 21,410 | Small et al. | Mar. 26, 1940 |
| 2,251,625 | Hale | Aug. 5, 1941 |
| 2,402,248 | Hale | June 18, 1946 |
| 2,485,126 | Wood | Oct. 18, 1949 |
| 2,516,059 | Lamphere | July 18, 1950 |
| 2,637,217 | Taylor | May 5, 1953 |
| 2,717,524 | Davis | Sept. 13, 1955 |